(12) United States Patent
Kleinow

(10) Patent No.: US 10,202,853 B2
(45) Date of Patent: Feb. 12, 2019

(54) PLY ARCHITECTURE FOR INTEGRAL PLATFORM AND DAMPER RETAINING FEATURES IN CMC TURBINE BLADES

(71) Applicant: GENERAL ELECTRIC COMPANY, Schenectady, NY (US)

(72) Inventor: Chad Daniel Kleinow, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 15/021,318

(22) PCT Filed: Sep. 11, 2014

(86) PCT No.: PCT/US2014/055205
§ 371 (c)(1),
(2) Date: Mar. 11, 2016

(87) PCT Pub. No.: WO2015/080781
PCT Pub. Date: Jun. 4, 2015

(65) Prior Publication Data
US 2016/0222800 A1    Aug. 4, 2016

Related U.S. Application Data

(60) Provisional application No. 61/876,589, filed on Sep. 11, 2013.

(51) Int. Cl.
*F01D 5/28*    (2006.01)
*F01D 5/26*    (2006.01)
(Continued)

(52) U.S. Cl.
CPC ............... *F01D 5/26* (2013.01); *F01D 5/147* (2013.01); *F01D 5/22* (2013.01); *F01D 5/282* (2013.01);
(Continued)

(58) Field of Classification Search
CPC ........ F01D 5/282; F01D 5/284; F01D 5/3007; F01D 5/3015; F01D 11/006; F01D 11/08
See application file for complete search history.

(56) References Cited

U.S. PATENT DOCUMENTS

| 3,181,835 A | 5/1965 | Davis |
| 3,501,090 A | 3/1970 | Stoffer et al. |

(Continued)

FOREIGN PATENT DOCUMENTS

| CN | 1060890 A | 5/1992 |
| CN | 1550642 A | 12/2004 |

(Continued)

OTHER PUBLICATIONS

Unofficial English Translation of Chinese Office Action issued in connection with corresponding CN Application No. 201480050321.0 dated Jul. 28, 2016.

(Continued)

*Primary Examiner* — Jason Shanske
*Assistant Examiner* — Behnoush Haghighian
(74) *Attorney, Agent, or Firm* — General Electric Company; William Andes

(57) ABSTRACT

Various embodiments are provided which provide an architecture for CMC plies to improve strength of damper retaining features of a turbine blade assembly. The plies (62) may also be integrated with the platform structure (50) to strength the CMC blade assembly.

20 Claims, 10 Drawing Sheets

(51) Int. Cl.
  F01D 5/22 (2006.01)
  F01D 5/14 (2006.01)
  *F01D 11/08* (2006.01)
  *F01D 5/30* (2006.01)
  *F01D 11/00* (2006.01)

(52) U.S. Cl.
  CPC ............ F01D 5/284 (2013.01); F01D 5/3084 (2013.01); *F01D 5/3007* (2013.01); *F01D 5/3015* (2013.01); *F01D 11/006* (2013.01); *F01D 11/08* (2013.01); *F05D 2220/32* (2013.01); *F05D 2300/10* (2013.01); *F05D 2300/6033* (2013.01); *F05D 2300/614* (2013.01); *Y02T 50/672* (2013.01)

(56) References Cited

U.S. PATENT DOCUMENTS

| | | |
|---|---|---|
| 3,801,222 A | 4/1974 | Violette |
| 3,887,298 A | 6/1975 | Hess et al. |
| 4,872,812 A | 10/1989 | Hendley et al. |
| 5,205,713 A | 4/1993 | Szpunar et al. |
| 5,261,790 A | 11/1993 | Dietz et al. |
| 5,281,097 A | 1/1994 | Wilson et al. |
| 5,284,421 A | 2/1994 | Chlus et al. |
| 5,478,207 A | 12/1995 | Stec |
| 5,749,705 A | 5/1998 | Clarke et al. |
| 5,785,499 A | 7/1998 | Houston et al. |
| 5,820,346 A | 10/1998 | Young et al. |
| 6,171,058 B1 | 1/2001 | Stec |
| 6,299,410 B1 | 10/2001 | Hilbert et al. |
| 6,354,803 B1 | 3/2002 | Grover et al. |
| 6,506,016 B1 | 1/2003 | Wang |
| 6,932,575 B2 | 8/2005 | Surace et al. |
| 7,097,429 B2 | 8/2006 | Athans et al. |
| 7,121,800 B2 | 10/2006 | Beattie |
| 7,121,801 B2 | 10/2006 | Surace et al. |
| 7,306,826 B2 | 12/2007 | Subramanian et al. |
| 7,322,797 B2 | 1/2008 | Lee et al. |
| 7,374,400 B2 | 5/2008 | Boswell |
| 7,467,924 B2 | 12/2008 | Charbonneau et al. |
| 7,513,379 B2 | 4/2009 | Gerard et al. |
| 9,022,733 B2 | 5/2015 | Coupe et al. |
| 2004/0228731 A1 | 11/2004 | Lagrange et al. |
| 2005/0158171 A1 | 7/2005 | Carper et al. |
| 2006/0056974 A1 | 3/2006 | Beattie |
| 2007/0148000 A1 | 6/2007 | Marusko et al. |
| 2009/0010762 A1 | 1/2009 | Caucheteux et al. |
| 2009/0257875 A1 | 10/2009 | McCaffrey et al. |
| 2010/0172760 A1 | 7/2010 | Ammann |
| 2010/0232938 A1 | 9/2010 | Harris, Jr. et al. |
| 2011/0027098 A1 | 2/2011 | Noe et al. |
| 2012/0055609 A1 | 3/2012 | Blanchard et al. |
| 2012/0163985 A1 | 6/2012 | Darkins, Jr. et al. |
| 2013/0064668 A1* | 3/2013 | Paige, II ............... F01D 5/284 416/219 R |
| 2014/0322024 A1 | 10/2014 | Watanabe |

FOREIGN PATENT DOCUMENTS

| | | |
|---|---|---|
| CN | 1749531 A | 3/2006 |
| CN | 101042055 A | 9/2007 |
| CN | 101294501 A | 10/2008 |
| EP | 0475428 A1 | 3/1992 |
| EP | 2392778 A2 | 12/2011 |
| EP | E2570600 A2 | 3/2013 |
| JP | 05113136 A | 5/1993 |
| JP | 1162502 A | 3/1999 |
| JP | 2000291407 A | 10/2000 |
| JP | 2006077759 A | 3/2006 |
| JP | 2007154898 A | 6/2007 |
| JP | 2007205350 A | 8/2007 |
| JP | 2010159748 A | 7/2010 |
| JP | 2010216474 A | 9/2010 |
| JP | 2012140935 A | 7/2012 |
| JP | 2013087663 A | 5/2013 |
| WO | 2010146288 A1 | 12/2010 |
| WO | 2011005337 A1 | 1/2011 |

OTHER PUBLICATIONS

Unofficial English Translation of Japanese Search Report issued in connection with corresponding JP Application No. 2016542104 dated Feb. 22, 2017.

Unofficial English Translation of Japanese Office Action issued in connection with corresponding JP Application No. 2016542104 dated Mar. 21, 2017.

U.S. Non-Final Office Action issued in connection with corresponding U.S. Appl. No. 14/411,523 dated Mar. 22, 2017.

Unofficial English Translation of Japanese Office Action issued in connection with corresponding JP Application No. 2015520254 dated Apr. 4, 2017.

International Search Report and Written Opinion dated May 28, 2015 which was issued in connection with PCT Patent Application No. PCT/US14/055205 which was filed on Sep. 11, 2014.

PCT Search Report and Written Opinion issued in connection with Related PCT Application No. PCT/US2013/045635 dated Sep. 12, 2013.

U.S. Non-Final Office Action issued in connection with Related U.S. Appl. No. 13/228,142 dated May 7, 2014.

U.S. Final Office Action issued in connection with Related U.S. Appl. No. 13/228,142 dated Dec. 3, 2014.

Unofficial English Translation of Chinese Office Action issued in connection with Related CN Application No. 201210328349.9 dated Feb. 11, 2015.

Unofficial English Translation of Chinese Office Action issued in connection with Related CN Application No. 201380035082.7 dated Jun. 3, 2015.

Unofficial English Translation of Chinese Office Action issued in connection with Related CN Application No. 201210328349.9 dated Jul. 9, 2015.

Unofficial English Translation of Japanese Office Action issued in connection with Related JP Application No. 2012195743 dated Jun. 28, 2016.

GE Related Case Form.

* cited by examiner

PLY ARCHITECTURE FOR INTEGRAL PLATFORM AND DAMPER RETAINING FEATURES IN CMC TURBINE BLADES

BACKGROUND

Present embodiments relate generally to rotor blades for gas turbine engines. More particularly, but not by way of limitation, present embodiments relate to ceramic matrix composite ply architecture for platform and damper retaining features integrally formed with the rotor blades.

In the gas turbine engine, air is pressurized in a compressor and mixed with fuel in a combustor for generating hot combustion gases which flow downstream through turbine stages. These turbine stages extract energy from the combustion gases. A high pressure turbine includes a first stage nozzle and a rotor assembly having a disk and a plurality of turbine blades. The high pressure turbine first receives the hot combustion gases from the combustor and includes a first stage stator nozzle that directs the combustion gases downstream through a row of high pressure turbine rotor blades extending radially outwardly from a first rotor disk. In a multi-stage turbine, a second stage stator nozzle is positioned downstream of the first stage blades followed in turn by a row of second stage rotor blades extending radially outwardly from a second rotor disk. The stator nozzles direct the hot combustion gas in a manner to maximize extraction at the adjacent downstream turbine blades.

The high pressure rotor discs are joined to the compressor rotors by a corresponding high pressure shaft for powering the compressor during operation. A multi-stage low pressure turbine follows the multi-stage high pressure turbine and is typically joined by a low pressure shaft to low pressure compressor and a fan disposed upstream from the low pressure compressor in a typical turbofan aircraft engine configuration.

As the combustion gases flow downstream through the turbine stages, energy is extracted therefrom and the pressure of the combustion gas is reduced. The combustion gas is used to power the compressor as well as a turbine output shaft for power. In this manner, fuel energy is converted to mechanical energy of the rotating shaft to power the compressor and supply compressed air needed to continue the process.

Turbine rotor assemblies typically include at least one row of circumferentially-spaced rotor blades. Each rotor blade includes an airfoil that having a pressure side and a suction side connected together at leading and trailing edges. Each airfoil extends radially outward from a rotor blade platform. Each rotor blade may also include a dovetail that extends radially inward from a shank extending between the platform and the dovetail. The dovetail is used to mount the rotor blade within the rotor assembly to a rotor disk or spool. Known blades are hollow such that an internal cooling cavity is defined at least partially by the airfoil, platform, shank, and dovetail.

These prior art rotor blades have been formed of metallic materials. However increased performance goals have resulted in a goal of using alternate materials to allow for higher turbine inlet temperatures. Improved temperature capability has been accomplished through the use of ceramic matrix composites in the gas turbine engine components. However, the integration of metallic or other material components with the ceramic matrix composite components has been problematic. For example, with respect to rotor blades, it is desirable to retain sheet metal dampers in determinant, robust manner during all operating conditions as well as making any damper retaining features integral with the CMC rotor blades.

As may be seen by the foregoing, it would be desirable to overcome these and other deficiencies in order to allow blade assembly of CMC with integral platform and damper retaining features.

BRIEF DESCRIPTION OF THE INVENTION

According to exemplary embodiments, various laid-up ply architectures are provided for forming a turbine blade having integral platform and damper retaining features. It is desirable to utilize continuous fiber to maximize structural capability of the ceramic matrix composite (CMC) components. With this in mind, the embodiments are provided so that the prepreg plies are long, continuous, and rooted in supporting features like the dovetail to provide an optimal structure. The embodiments may utilize continuous fiber laid-up plies which extend from the root and/or shank and may be split apart in a radial direction to form a damper retaining pocket. Some embodiments may include plies continuously extending in forward and aft directions to seal surfaces to define an area where a damper retaining feature, for example a pocket, may be formed. These plies may be integrated into the angel wings or seal overlaps. According to some other embodiments, additional structural support may include plies laid-up in the inside planar faces of the angel wings which further extend into the shank for improved structural support. According to some embodiments, the blade may include continuous fiber CMC plies extending above and below the damper pocket and having damper retaining tabs formed at the leading and trailing edges of both the pressure and the suction side of the blade.

According to some embodiments, a rotor blade assembly for a gas turbine engine comprises a blade portion formed of laid-up ceramic matrix composite (CMC) material having a leading edge and a trailing edge, a pressure side extending between the leading edge and the trailing edge, a suction side opposite the pressure side, the suction side extending between the leading edge and the trailing edge, a root formed of the laid-up CMC material having a dovetail at a radially inward end, a shank formed of the laid-up CMC material and integrally with the root, the shank extending from the root and a platform extending circumferentially from the shank. A plurality of continuous fiber damper retaining plies of the CMC material extend from the root to the platform. The plurality of continuous fiber damper retaining plies are split apart to define an upper at least one ply and a lower at least one ply near a leading edge and a trailing edge. The upper at least one ply extends from the leading edge to the trailing edge. The lower at least one ply is disposed at the leading edge and the trailing edge opposite the upper at least one ply, the lower at least one ply forms a damper retaining tab extending from the shank and defines a damper pocket near a leading edge and a trailing edge. A sheet metal damper disposed in the damper pocket.

Optionally, the lower at least one ply extends continuously from the leading edge to the trailing edge. The lower at least one ply may be discontinuous between the leading edge and the trailing edge. The damper pocket may receive a machining stock. The rotor blade assembly wherein the machining stock is formed of at least one of resin, matrix, chopped fiber, compound stacks of reinforced fiber plies, and laminate reinforced fiber or fiber stacks.

According to other embodiments, a rotor blade assembly for a gas turbine engine comprises a blade portion formed of laid-up ceramic matrix composite (CMC) material having a leading edge and a trailing edge, a pressure side extending between the leading edge and the trailing edge, a suction side opposite the pressure side, the suction side extending between the leading edge and the trailing edge, and a root formed of the laid-up CMC material having a dovetail at a radially inward end. A shank is formed of the laid-up CMC material and integrally with the root, the shank extends from the root and a platform extends circumferentially from the shank. A platform defined by a plurality of continuous fiber CMC flow path plies extending from forward of the leading edge to aft of the trailing edge. Angel wings are formed of continuous fiber CMC angel wing plies. The angel wing plies are disposed beneath the plurality of damper retaining plies at a leading edge and a trailing edge, the angel wings extend in a circumferential direction and in an axial direction. At least one support ply is disposed between the flow path plies and the angel wing plies at leading and trailing edges and extending axially therebetween defining a damper pocket between the flow path plies and the at least one support ply. A sheet metal damper is disposed in the damper pocket.

Optionally, the rotor blade assembly of the at least one support ply extending at an angle to an engine axis. The rotor blade assembly of the at least one support ply having ends which are curvilinear to allow positioning between the flow path plies and the angel wing plies.

According to a further embodiment, a rotor blade assembly for a gas turbine engine comprises a blade portion formed of laid-up ceramic matrix composite (CMC) material having a leading edge and a trailing edge, a pressure side extending between the leading edge and the trailing edge, a suction side opposite the pressure side, the suction side extending between the leading edge and the trailing edge, a root formed of the laid-up ceramic matrix composite (CMC) material having a dovetail at a radially inward end. A shank is formed of the laid-up CMC material and integrally with the root, the shank extending from the root and a platform extending circumferentially from the shank. A plurality of continuous fiber damper retaining plies of the CMC material extend from the root to the platform, the plurality of continuous fiber damper retaining plies extending upwardly and turning outward in the circumferential direction. Angel wings are formed of laid-up continuous fiber CMC angel wing plies, the angel wing plies disposed beneath the plurality of damper retaining plies and into the damper retaining plies at a leading edge and a trailing edge, the angel wings extending in a circumferential direction and in an axial direction. Retaining tabs are formed of a plurality of laid-up CMC retaining tab plies formed near the leading edge and the trailing edge of the pressure side and the suction side, the retaining tabs being positioned axially inward of the angel wings. The retaining tabs further comprise the plurality of laid-up CMC retaining tab plies extending in a direction of the leading edge and a direction of the trailing edge. An upper end of the damper retaining plies and the retaining tabs forming a damper pocket near the leading edge and the trailing edge. A sheet metal damper is disposed in the damper pocket.

According to still a further embodiment, a rotor blade assembly comprises a blade portion formed of laid-up ceramic matrix composite (CMC) material having a leading edge and a trailing edge, a pressure side extending between the leading edge and the trailing edge, a suction side opposite the pressure side, the suction side extending between the leading edge and the trailing edge. A root formed of the laid-up CMC material having a dovetail at a radially inward end. A shank is formed of the laid-up CMC material and integrally with the root, the shank extends from the root and a platform extending circumferentially from the shank. A plurality of continuous fiber damper retaining plies of the CMC material, the plurality of damper retaining plies extend from the root to the platform, the plurality of continuous fiber damper retaining plies are split apart to define an upper at least one ply and a lower at least one ply near a leading edge and a trailing edge. The upper at least one ply extending from the leading edge to the trailing edge. The lower at least one ply extend between the leading edge and the trailing edge opposite the upper at least one ply and defining a damper pocket near a leading edge and a trailing edge. A c-shaped at least one ply is located within the damper pocket between the upper at least one ply and the lower at least one ply. A sheet metal damper is disposed in the damper pocket and between ends of the c-shaped at least one ply.

All of the above outlined features are to be understood as exemplary only and many more features and objectives of the ply architecture may be gleaned from the disclosure herein. Therefore, no limiting interpretation of this summary is to be understood without further reading of the entire specification, claims, and drawings included herewith.

BRIEF DESCRIPTION OF THE DRAWINGS

The above-mentioned and other features and advantages of these embodiments, and the manner of attaining them, will become more apparent and the CMC ply architecture for integral platform and damper retaining features will be better understood by reference to the following description of embodiments taken in conjunction with the accompanying drawings, wherein.

DETAILED DESCRIPTION

Figure 1:
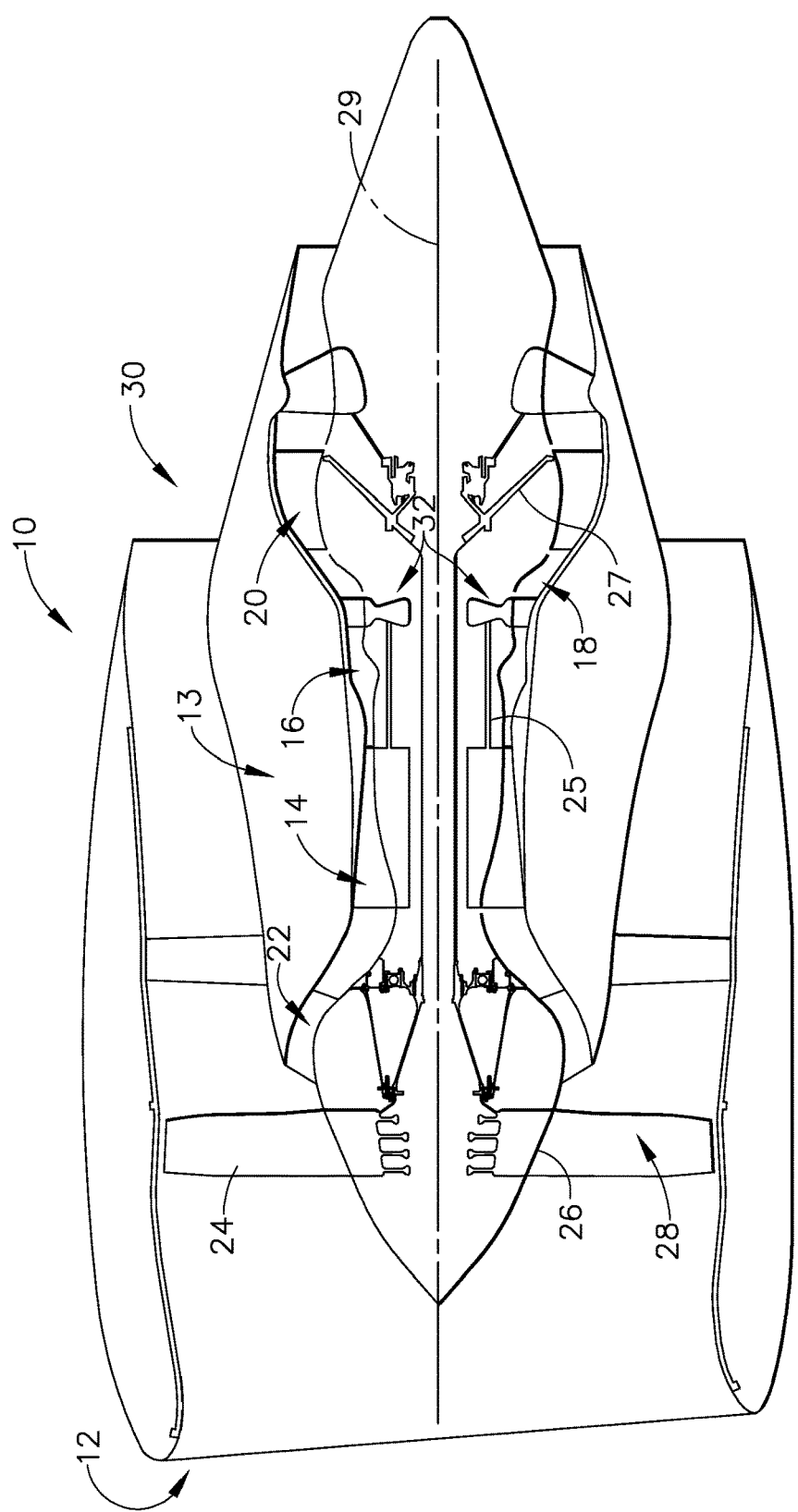
FIG. 1 is a schematic side section view of a gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present embodiments cover such modifications and variations as come within the scope of the appended claims and their equivalents.

Referring now to FIGS. 1-10, various embodiments of methods and apparatuses for laying-up CMC plies are provided to form integral platform and damper retaining features. The ply architectures may extend in radial directions from the dovetail and extend axially either continuously or discontinuously across the rotor blade. Retaining tabs may also be provided and integrally formed of continuous fiber CMC lay-ups which are integrated in either or both of seal overlaps or angel wings of the rotor blade. These retaining tabs may include plies originating in the shank area of the rotor blade. Additionally, the retaining feature may include wrap-around plies disposed in a damper pocket.

The terms fore and aft are used with respect to the engine axis and generally mean toward the front of the turbine engine or the rear of the turbine engine in the direction of the engine axis.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine outlet, or a component being relatively closer to the engine outlet as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions.

Referring initially to FIG. 1, a schematic side section view of a gas turbine engine 10 is shown having an engine inlet end 12 wherein air enters the propulsor or core 13 which is defined generally by a multi-stage high pressure compressor 14, a combustor 16 and a multi-stage high pressure turbine 18. Collectively, the propulsor 13 provides power for operation of the engine 10.

The gas turbine engine 10 further comprises a fan assembly 28, a low pressure turbine 20, and a low pressure compressor or booster 22. The fan assembly 28 includes an array of fan blades 24 extending radially outward from a rotor disc shown generally at 26. Opposite the intake side 12 is an exhaust side 30. In one embodiment, engine 10 is, for non-limiting example, a CT7 engine commercially available from General Electric Aircraft Engines, Cincinnati, Ohio. Although the gas turbine 10 is shown in an aviation embodiment, such example should not be considered limiting as the gas turbine 10 may be used for aviation, power generation, industrial, marine or the like.

In operation air enters through the air inlet end 12 of the engine 10 and moves through at least one stage of compression in the compressors 22, 14 where the air pressure is increased and directed to the combustor 16. The compressed air is mixed with fuel and burned providing the hot combustion gas which exits the combustor 16 toward the high pressure turbine 18. At the high pressure turbine 18, energy is extracted from the hot combustion gas causing rotation of turbine blades 32 which in turn cause rotation of the high pressure shaft 25. The high pressure shaft 25 passes toward the front of the engine to continue rotation of the one or more compressor 14 stages and continue the power cycle. A low pressure turbine 20 may also be utilized to extract further energy and power additional compressor stages. The turbofan 28 is connected by the low pressure shaft 27 to a low pressure compressor 22 and the low pressure turbine 20. The turbofan 28 creates thrust for the turbine engine 10. The low pressure and or by-pass air may be used to aid in cooling components of the engine as well.

The gas turbine 10 is axis-symmetrical about engine axis 29 so that various engine components rotate thereabout. An axi-symmetrical high pressure shaft 25 extends through the turbine engine forward end into an aft end and is journaled by bearings along the length of the shaft structure. The shaft 25 rotates about the axis or centerline 29 of the engine 10. The high pressure shaft 25 may be hollow to allow rotation of a low pressure turbine shaft 27 therein and independent of the high pressure shaft 25 rotation. The low pressure shaft 27 also may rotate about the centerline axis 29 of the engine. During operation the shaft rotates along with other structures connected to the shaft such as the rotor assemblies of the turbine in order to create power or thrust for various types of turbines used in power and industrial or aviation areas of use.

Figure 2:
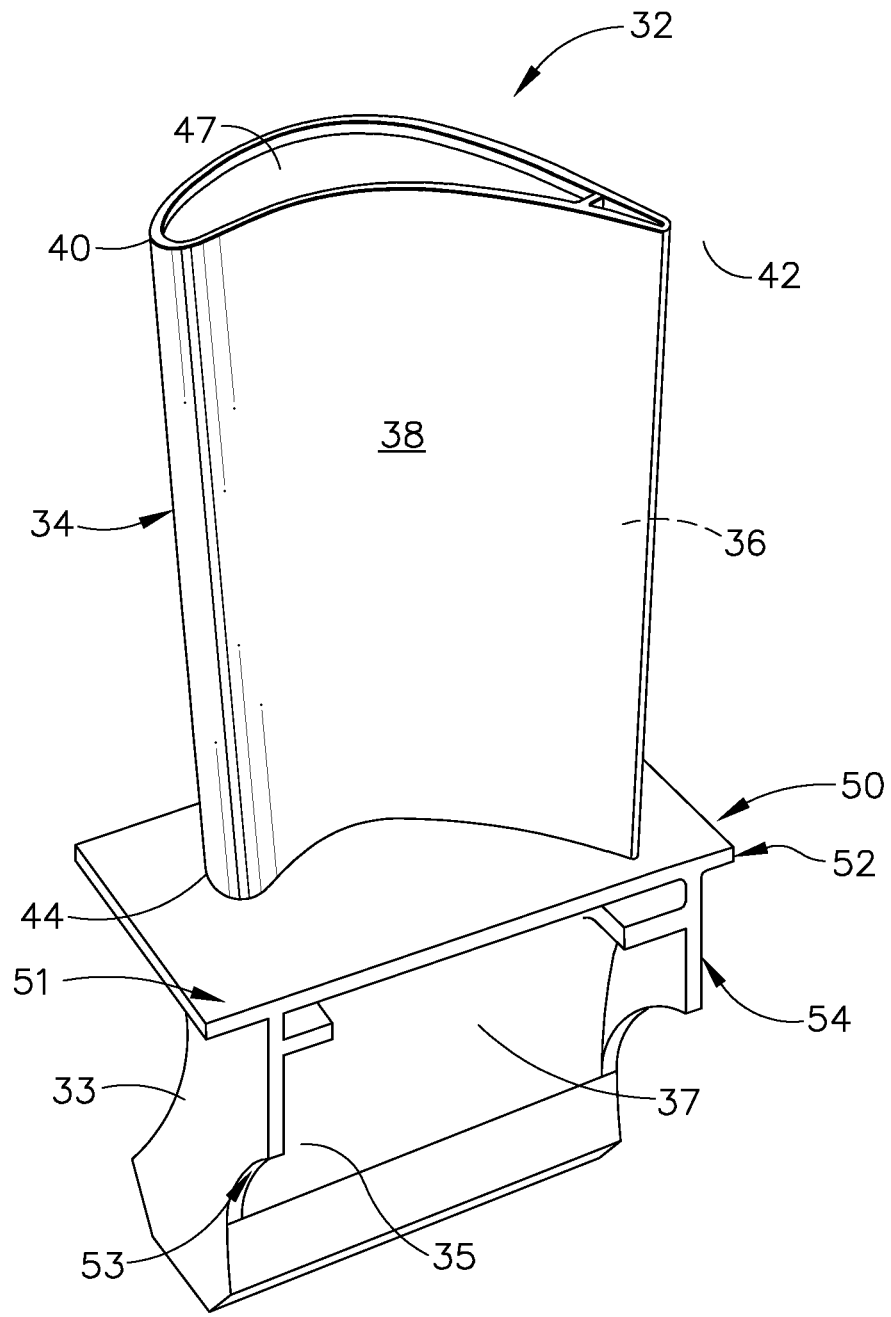
FIG. 2 is a perspective view of a ceramic matrix composite (CMC) rotor blade assembly that may be used with the gas turbine shown in FIG. 1.

FIG. 2 is a perspective view of a rotor blade assembly 32 that may be used with gas turbine engine 10 (shown in FIG. 1). Each rotor blade assembly 32 includes a generally hollow airfoil 34 and an integral dovetail 33 used for mounting airfoil 34 to a rotor disk (not shown) in a known manner. Although specific dovetail and airfoil shapes are shown, one skilled in the art will realize that these are not limiting. In one embodiment, a plurality of rotor blade assemblies 32 form a high pressure turbine rotor blade stage (not shown) of gas turbine engine 10. Although a turbine rotor blade is shown and described, the present embodiments may be applied to compressor rotor blades or other blade or airfoil structures.

The airfoil 34 includes a first sidewall 36 and a second sidewall 38. First sidewall 36 is convex and defines a suction side of airfoil 34, and second sidewall 38 is concave and defines a pressure side of airfoil 34. Sidewalls 36 and 38 are connected together at a leading edge 40 and near an axially-spaced trailing edge 42 of airfoil 34 that is downstream from the leading edge 40. Airfoil 34 includes a plurality of film holes 46 that are spaced radially along sidewalls 36 and 38 and between an airfoil tip 47 and a blade root 44 for discharging cooling fluid from airfoil 34 to facilitate cooling an outer surface of airfoil 34. Airfoil 34 also includes a plurality of trailing edge slots 48 spaced radially between airfoil tip 47 and blade root 44 along trailing edge 42 for discharging cooling fluid from airfoil 34 to facilitate cooling airfoil trailing edge 42. Heat transfer enhanced by film holes 46 and trailing edge slots 48 facilitates cooling along airfoil outer surfaces 36, 38.

First and second sidewalls 36 and 38, respectively, extend radially from platform 50 which is at a root end 44 of the airfoil 34. The lower surface of the platform 50 receives the dovetail 33. The dovetail 33 may take various forms and should not be limited to single shape depicted. The dovetail 33 has pressure faces 35 which are retained by and transfer load to the rotor disk (not shown). Cooling circuits may extend from the dovetail 33 radially upwardly through the blade 34 to provide cooling fluid communication with the apertures 46, 48.

The platform 50 extends beyond the outer perimeter of each airfoil 34 and includes forward and aft seal overlaps 51, 52 and forward and aft angel wings 53, 54. The overlaps and angel wing structures 51-54 are utilized to seal against rotor hardware limiting leakage in and around the blade assembly 32. The angel wings extend radially downward from the platform 50 and may extend inwardly to the shank portion 37 of the dovetail 33. Additionally, the angel wings 53, 54 may extend in a circumferential or tangential direction beneath the platform so as to provide sealing characteristics beneath the entirety of the forward and aft ends of the platform 50.

Figure 3:
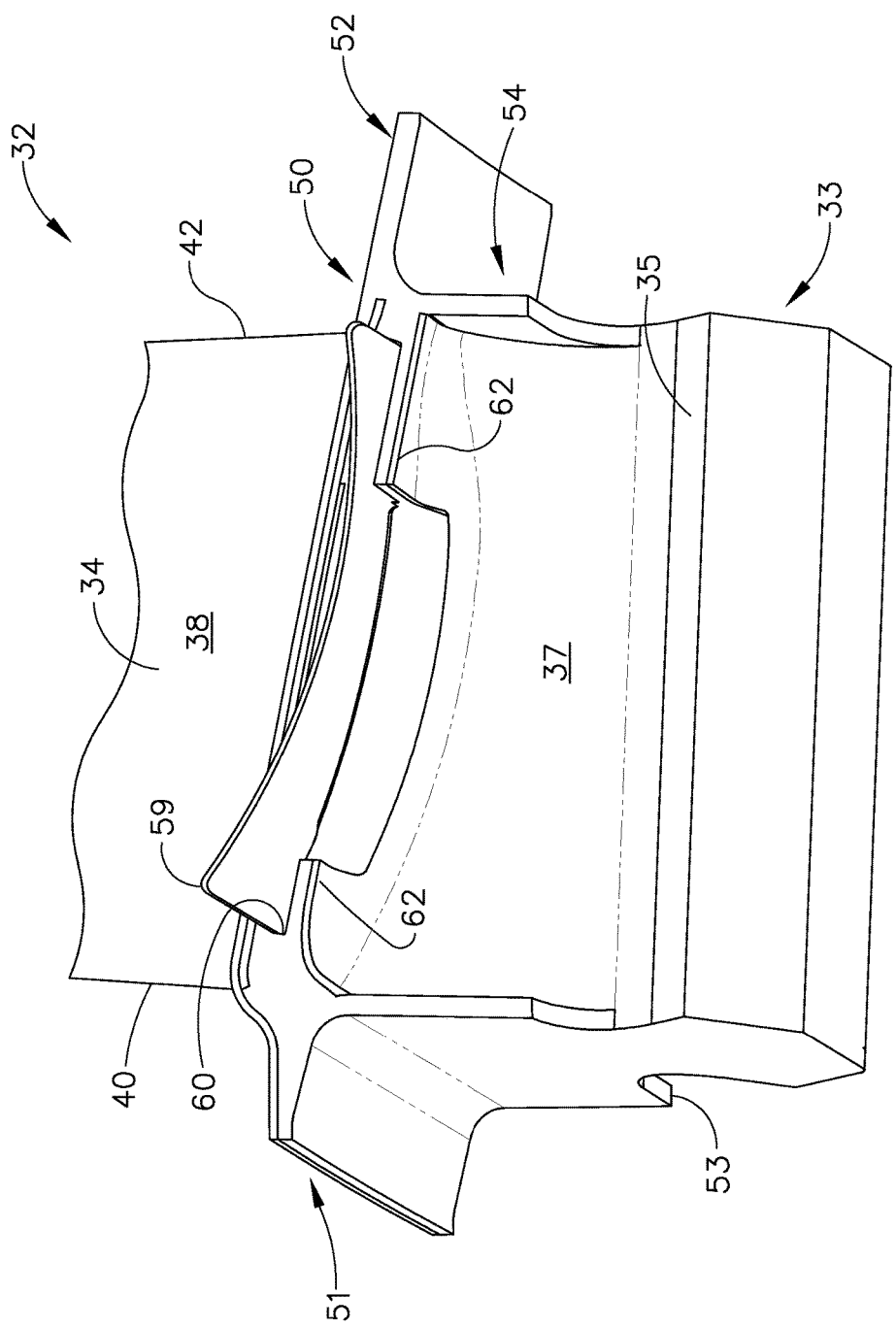
FIG. 3 is an isometric view of a side of a blade having a first CMC ply architecture.
Figure 4:
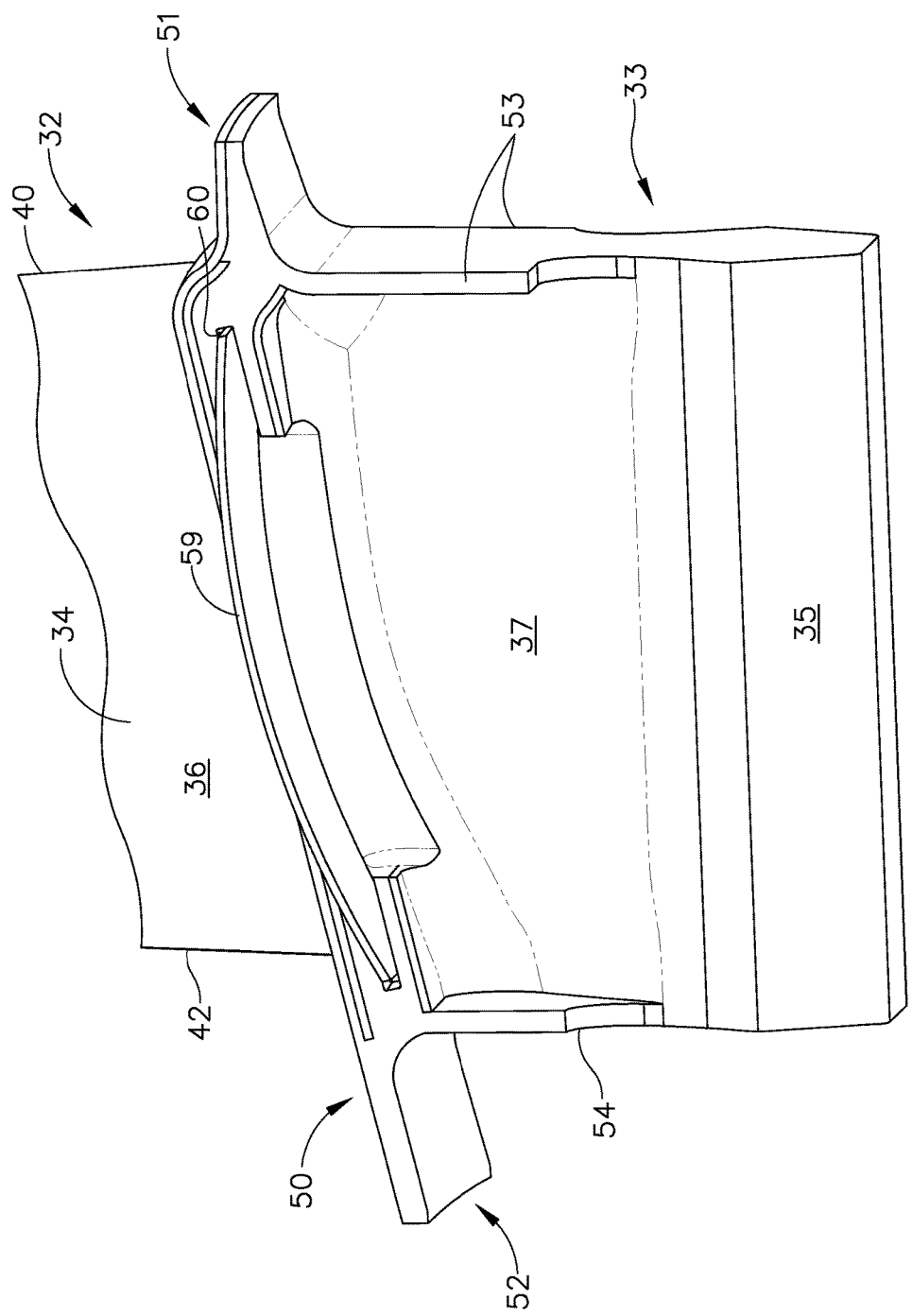
FIG. 4 is an opposite side isometric view of the embodiment of FIG. 3.

Referring now to FIGS. 3 and 4, opposed side isometric views of blade assemblies 32 are depicted. Portions of the airfoil 34 above the platform 50 are removed. The views depict the lower portion of the blade assembly 32 including the platform 50 and dovetail 33. The dovetail 33 has a lower end and an upper end which connects to a shank 37. The shank 37 extends between the dovetail 33 and the platform 50.

CMC materials have a characteristic wherein the material's tensile strength in the direction parallel to the length of the fibers (the "fiber direction") is stronger than the tensile strength in the direction perpendicular. This perpendicular direction may include matrix, interlaminar, secondary or tertiary fiber directions. Various physical properties may also differ between the fiber and the matrix directions.

Higher operating temperatures for gas turbines are continuously sought in order to increase their efficiency. CMC materials are a notable example because their high temperature capabilities can significantly reduce cooling air requirements. CMC materials generally comprise a ceramic fiber reinforcement material embedded in a ceramic matrix material. The reinforcement material may be continuous fibers serves as the load-bearing constituent of the CMC in the event of a matrix crack. In turn, the ceramic matrix protects the reinforcement material, maintains the orientation of its fibers, and serves to dissipate loads to the reinforcement material. Silicon-based composites, such as silicon carbide (SiC) as the matrix and/or reinforcement material, are of particular interest to high-temperature applications, for example, high-temperature components of gas turbines including aircraft gas turbine engines and land-based gas turbine engines used in the power-generating industry. The instant embodiments utilize a ceramic matrix composite material to form the blade assembly 32. CMC is a non-metallic material having high temperature capability and low ductility as compared with Nickel-based superalloys. Generally, CMC materials include a ceramic fiber, for example a silicon carbide (SiC), forms of which are coated with a compliant material such as boron nitride (BN). The fibers are coated in a ceramic type matrix, one form of which is silicon carbide (SiC). Typically, the blade assembly 32 is constructed of low-ductility, high-temperature-capable materials. CMC materials generally have room temperature tensile ductility of less than or equal to about 1% which is used herein to define a low tensile ductility material. More specifically, some CMC materials have a room temperature tensile ductility in the range of about 0.4% to about 0.7%. Composite materials utilized for such CMC components include silicon carbide, silicon, silica or alumina matrix materials and combinations thereof. Typically, ceramic fibers are embedded within the matrix such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). CMC materials typically have coefficients of thermal expansion in the range of about $1.3 \times 10^{-6}$ in/in/degree F. to about $3.5 \times 10^{-6}$ in/in/degree F. in a temperature of approximately 1000-1200 degree F. However, these are characteristics that should not be considered limiting.

Formation processes generally entail the fabrication of CMCs using multiple prepreg layers, each in the form of a "tape" comprising the desired ceramic fiber reinforcement material, one or more precursors of the CMC matrix material, and organic resin binders. According to conventional practice, prepreg tapes can be formed by impregnating the reinforcement material with a slurry that contains the ceramic precursor(s) and binders. Materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the pliability of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix.

After allowing the slurry to partially dry and, if appropriate, partially curing the binders (B-staging), the resulting prepreg tape is laid-up with other tapes, and then debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo melt infiltration (MI) to fill the porosity and yield the CMC component. Specific processing techniques and parameters for the above process will depend on the particular composition of the materials.

With regard again to FIGS. 3 and 4, structural plies of ceramic matrix composite material may be positioned above the damper pockets 60 in either of these embodiments in order to provide additional structural strength. Further, CMC plies may be utilized on the upper surface of the platform 50 in order to define the inner turbine flow path surface. The plies defining the platform extend axially between the seal overlays 51, 52. The seal overlaps 51, 52 are further defined by plies forming the angel wings 53, 54. The angel wing plies support the damper retaining plies from below and extend down to the dovetail 33.

Figure 5:
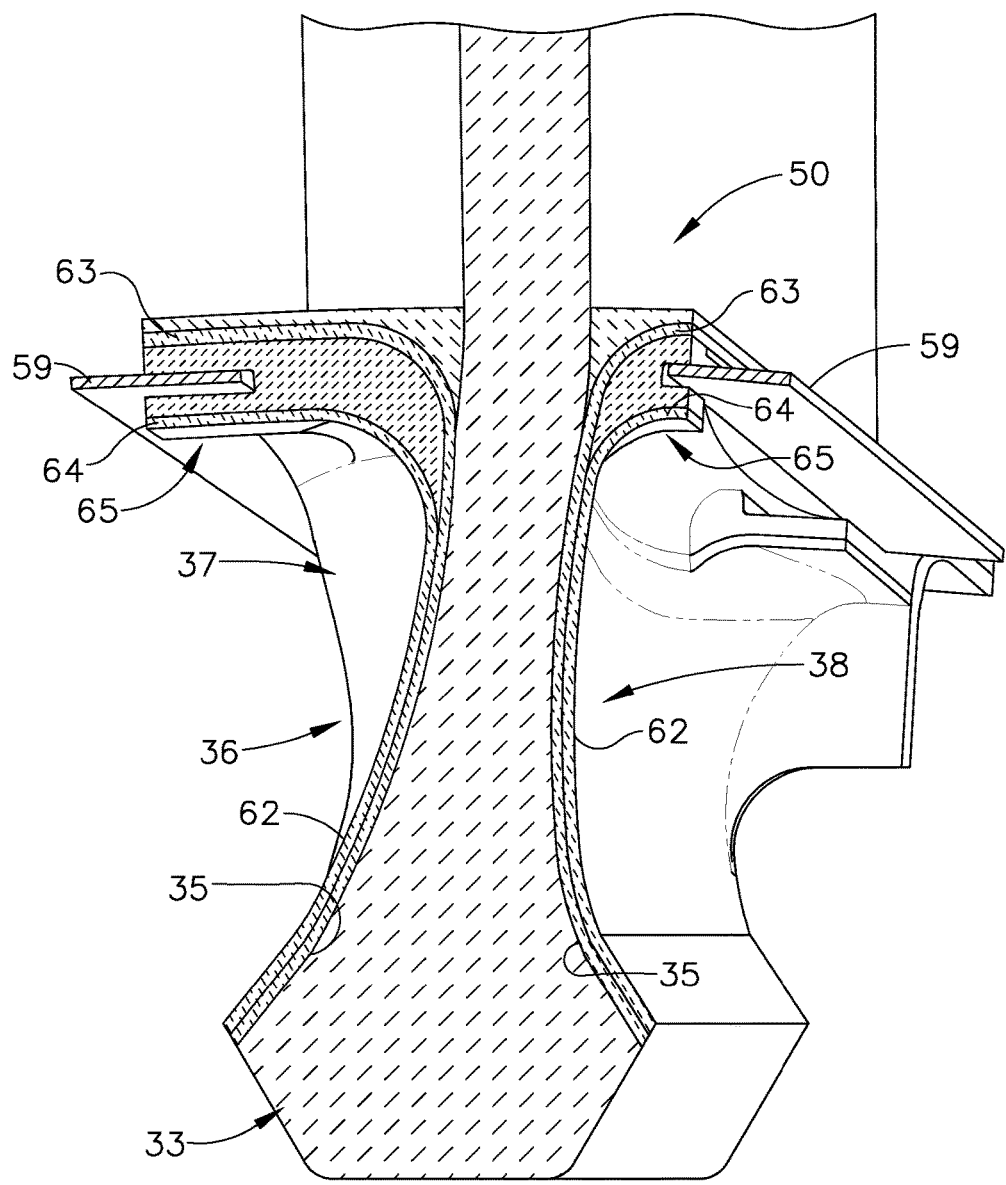
FIG. 5 is a section view of the embodiment of FIGS. 3 and 4, at the leading edge of a rotor blade.
Figure 6:
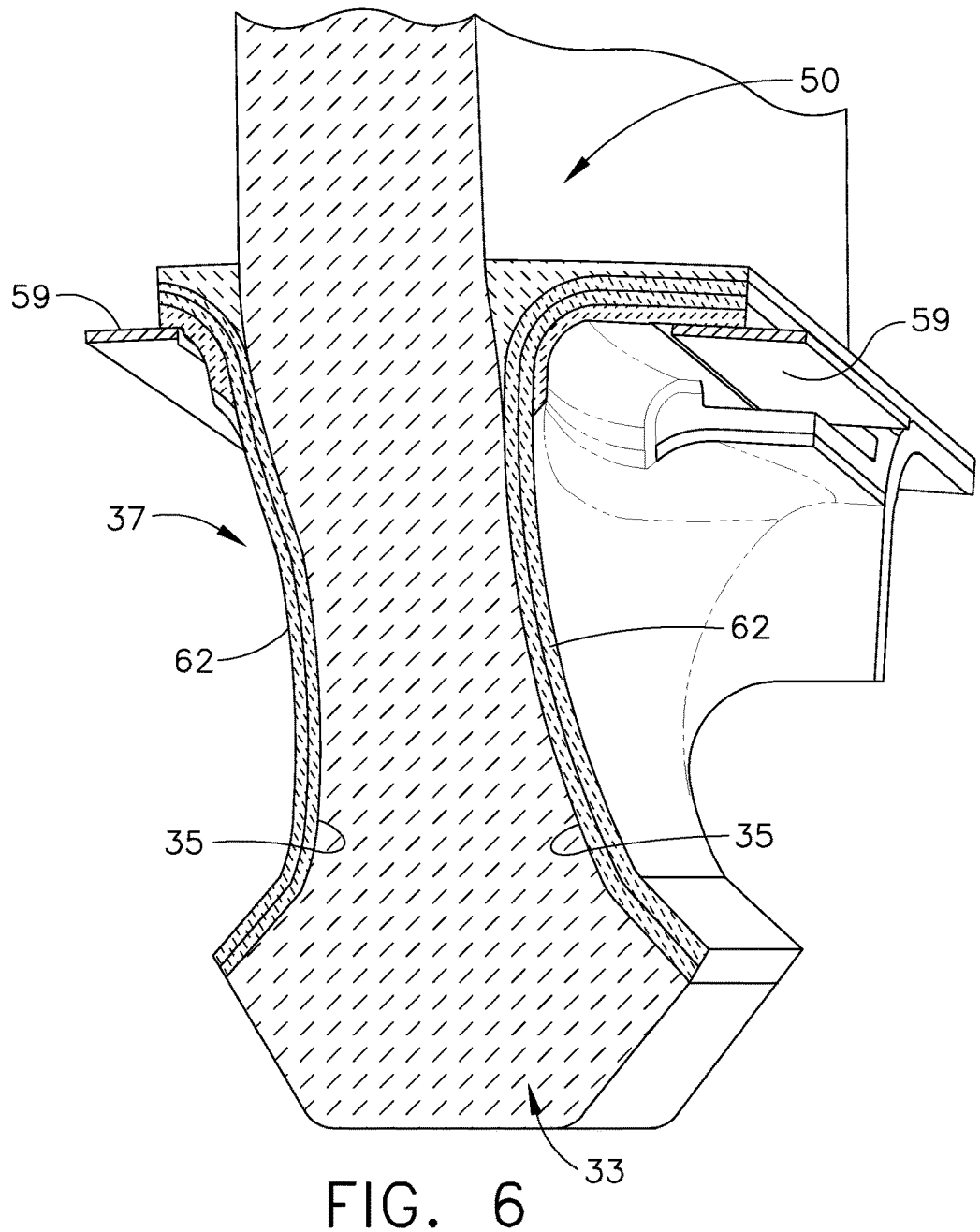
FIG. 6 is a section view of the embodiment of FIGS. 3 and 4 at the mid-plane of the rotor blade.
Figure 7:
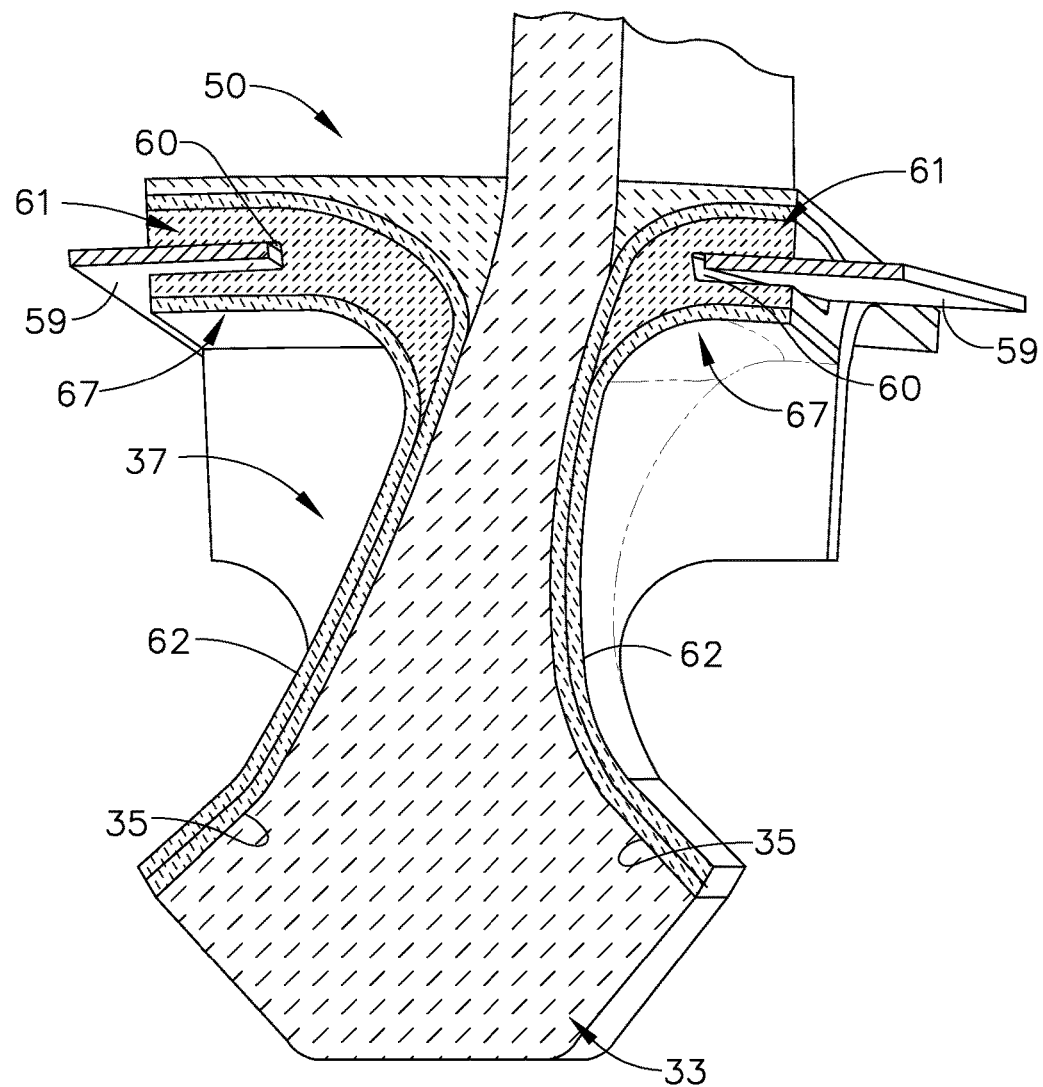
FIG. 7 is a section view of the embodiment of FIGS. 3 and 4 at the trailing edge of the rotor blade.

With reference additionally now to FIGS. 5, 6 and 7, cross-sectional views of the damper retaining plies 62 are depicted. The damper retainer plies 62 extend upwardly along both the pressure side 38 and the suction side 36 and are split apart near the platform 50. With reference specifically to FIGS. 3-5, the damper retaining plies 62 extend upwardly and as shown in the FIG. 5 depicting the leading edge. The ply 62 splits apart and defines an upper ply 63 and a lower ply 64 as seen with reference to FIG. 5 on each of the pressure and suction sides, and a damper retaining pocket 60 between the upper ply 63 and the lower ply 64. It should be understood that while the term "ply" is utilized in this description, the damper retaining ply 62 and the split-apart plies 63, 64 formed therefrom may be one or more layers of ceramic matrix composite material. Similarly, the term plies may mean one or more plies as well. These plies may be unidirectional, multidirectional and may be of equal or varying thickness.

With reference to FIG. 7, the damper retaining ply 62 extends upward from the dovetail 33 along the shank 37. Similarly, near the platform 50, the FIG. 7 depicts a section view of the trailing edge of the blade assembly 32. As with the leading edge, the damper retaining plies 62 extend upwardly and split apart forming the damper retaining pockets 60. Thus, as can be seen from the comparison of FIGS. 3-5 and 7, these retaining pockets 60 are formed toward the leading edge and trailing edge of the blade assembly 32 and are defined by the retaining tabs 65, 67 at these locations.

However, with reference to FIGS. 3, 4 and 6, one skilled in the art will recognize that the damper retaining plies 62 extend upwardly and may not be split apart in the mid-plane area of the blade assembly 32. In this mid-plane area, the damper 59 may not be enclosed by retaining tabs as depicted in FIGS. 5 and 7.

Within the damper retaining pocket 60, sacrificial machining insert 61 may be positioned. These machining inserts 61 may be formed of various materials and disposed between the upper and lower plies 63, 64 of the damper retaining ply 62. The machining insert 61 may be one or more of resin, matrix, chopped fiber, compound stacks of reinforced fiber plies, and laminate reinforced fiber or fiber stacks, or the like structure. The materials may be oriented in various directions and have various dimensions depending on the thickness between the plies 63, 64. As previously described, the upper and lower plies 63, 64 may be formed of one or more structural plies to provide additional structural strength for retaining the damper 59 at the leading and trailing edges on both of the pressure and suction sides.

Figure 8:
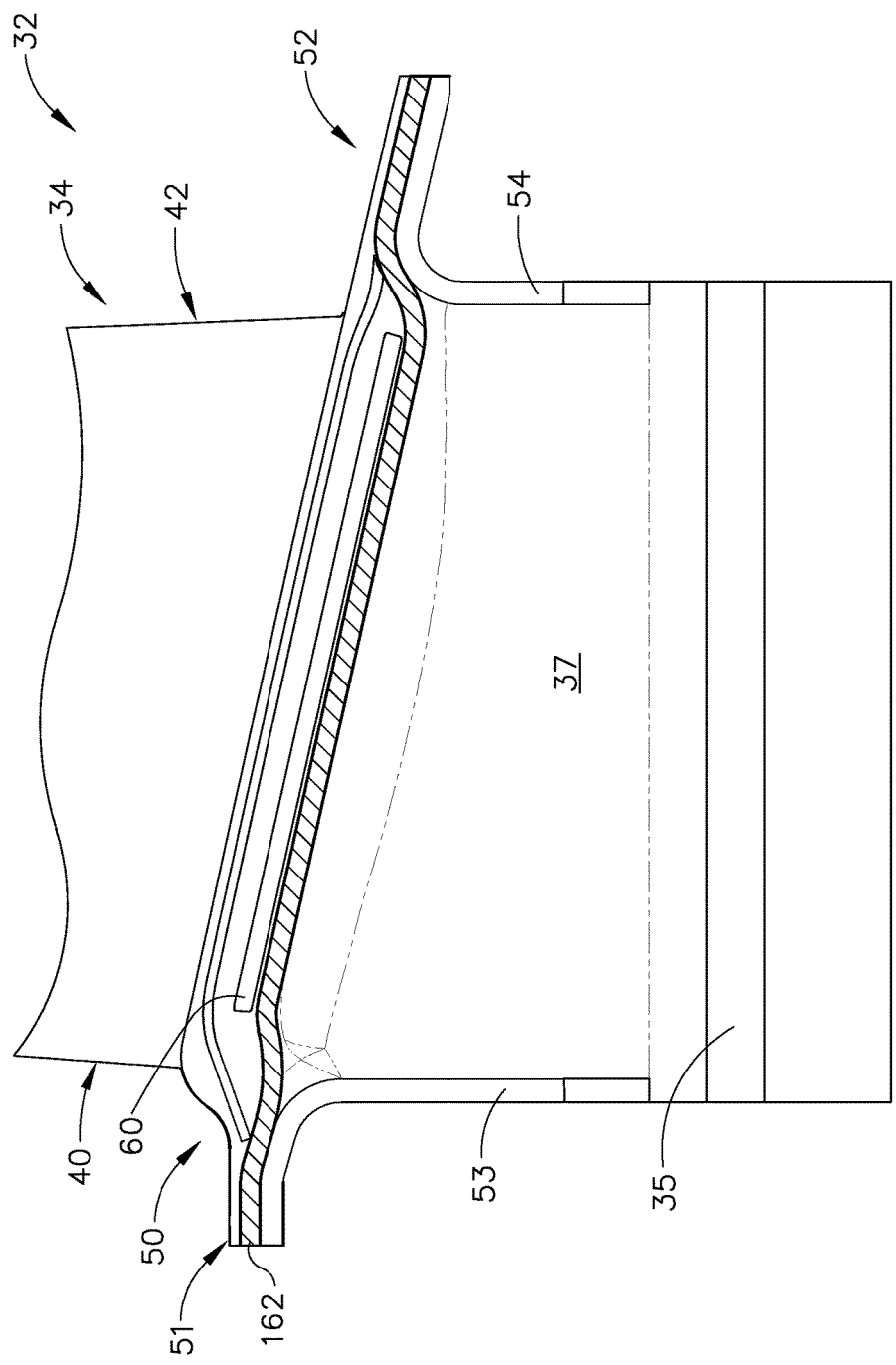
FIG. 8 is a side view of an alternative embodiment having lower plies extending continuously and axially across the rotor blade.

Referring now to FIG. 8, a side view of an alternate embodiment is depicted. With reference briefly to the previous embodiment, the damper retaining plies did not extend continuously across the blade assembly 32 from the leading edge 40 to the trailing edge 42. Instead, the retaining tabs 65, 67 were formed at the forward and aft axial ends of the blade assembly 32. Contrary to that embodiment, the FIG. 8 embodiment utilizes a damper retaining or support ply 162 that extends continuously beneath the upper surface platform 50 from at least the leading edge 40 to the trailing edge 42, rather than discontinuously as in the previous embodiment. In the instant embodiment, the damper retaining ply 162 is sandwiched between the seal overlaps 51, 52 at the leading and trailing ends of the blade assembly 32. The ply 162 may be formed of one or more plies and may be formed of varying thickness depending upon loading requirements.

According to this embodiment, additional layers of continuous structural fiber CMC may also be located along the upper surface of platform 50 to define the inner turbine flow path surface. The damper pocket 60 may be formed above the damper retaining ply 162 and beneath the inner turbine flow path surface along the upper surface of platform 50. In this way, the platform 50 is integrally formed with the blade assembly 32 and the damper retaining feature is also integrally formed. According to some embodiments, the damper retaining ply 162 is sandwiched within the seal overlap 51, 52. However in other embodiments, the damper retaining layer 162 may be pre-formed with the angel wings 53, 54. Additionally, according to some embodiments the damper retaining ply 162 may be tucked against the angel wings 53, 54.

Figure 9:
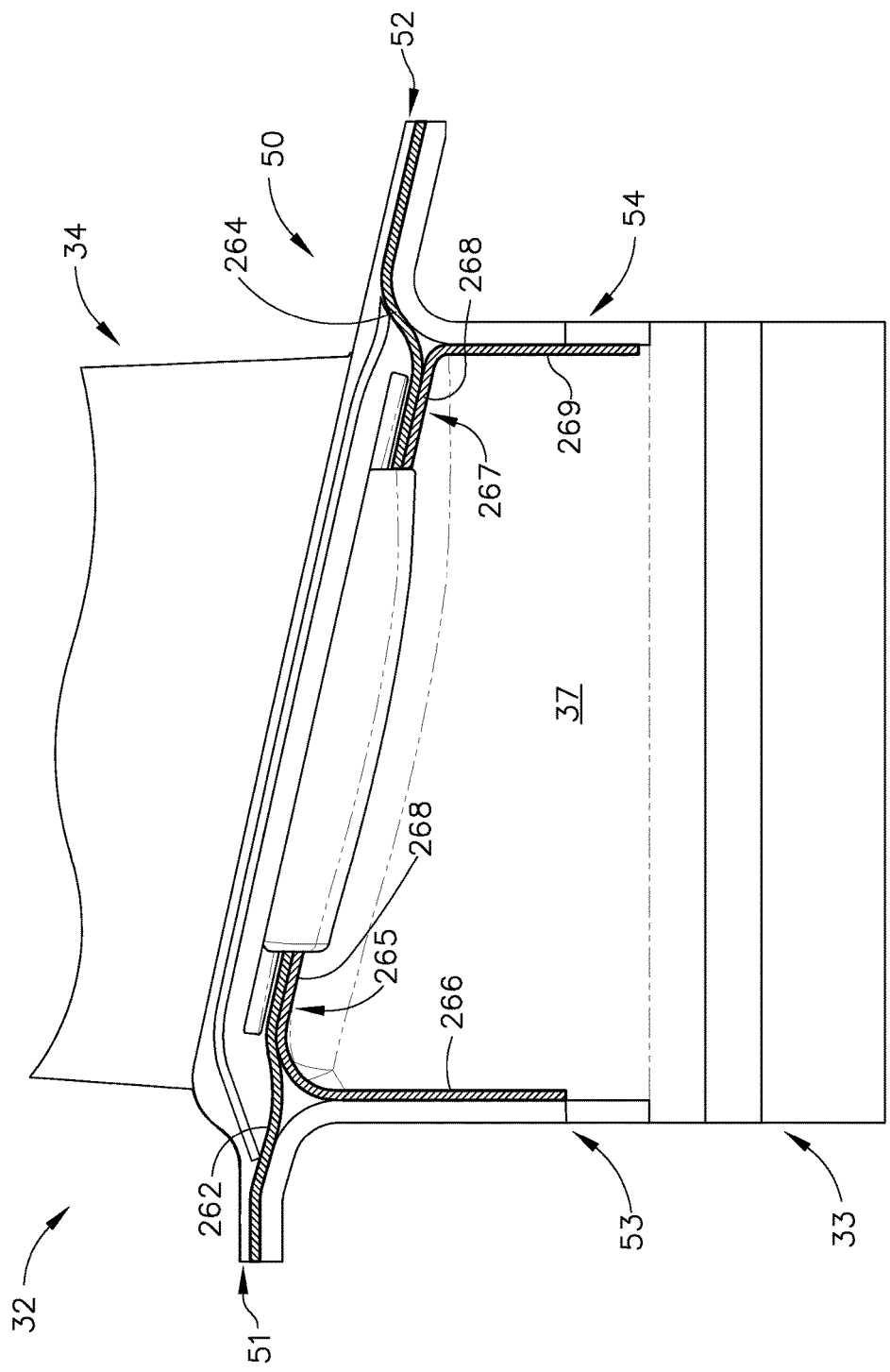
FIG. 9 is a side view of a further alternative embodiment having plies defining a damper retaining tab which may be formed integrally with the seal overlaps and/or angel wings; and, FIG. 10 is a further embodiment having wrap-around plies that are located in a damper retaining feature.

With reference now to FIG. 9, an additional embodiment is depicted wherein the rotor blade assembly 32 is shown in a side view. The embodiment includes an airfoil 34 extending from platform 50 and includes a dovetail 33 extending upwardly to a shank 37 which is connected to the platform 50. In this embodiment, a damper retaining or support ply 262 extend from a forward seal overlap 51 and a damper retaining or support ply 264 extends axially inward from the aft seal overlap 52. The plies 262, 264 are shown as being formed separately according to some embodiments. However, these plies may be formed singularly as shown in FIG. 8 so as to extend completely from the forward to the aft end of blade 32, for example as shown in FIG. 8. The plies 262, 264 form the upper portion of tabs 265, 267 which serve to hold the damper in position. Further, the plies 262, 264 may be omitted or used in combination with the damper retaining tabs 265, 267 discussed further herein.

Additionally, the tabs 265, 267 are formed by one or more lower plies 268. In the depicted embodiment, the ply 268 extends across the blade 32 however, the ply 268 may be defined by two axially extending plies which are discontinuous rather than continuous. Further, plies 266, 269 depend downwardly from the play 268 to join with the angel wings 53, 54 and provide added structural strength. Thus, according to the instant embodiments, the plies 266, 268, 269 are L-shaped and extend upwardly and inset from the angel wings 53, 54. These L-shaped structures may be continuous across the blade assembly 32 or may be discontinuous depending on how the ply 168 is formed. The damper retaining plies 262, 264, 266, 268, 269 all may be connected in order to form the damper retaining tabs 265, 267. According to alternate embodiments, the plies 266, 268 may also be formed with the angel wings 53, 54 rather than along axially inward planer surfaces thereof as shown. The plies 262, 264, 266, 268 may be formed along the inner planer faces of the angel wings 53, 54 downwardly along the shank 37 for improved structural support.

Figure 10:
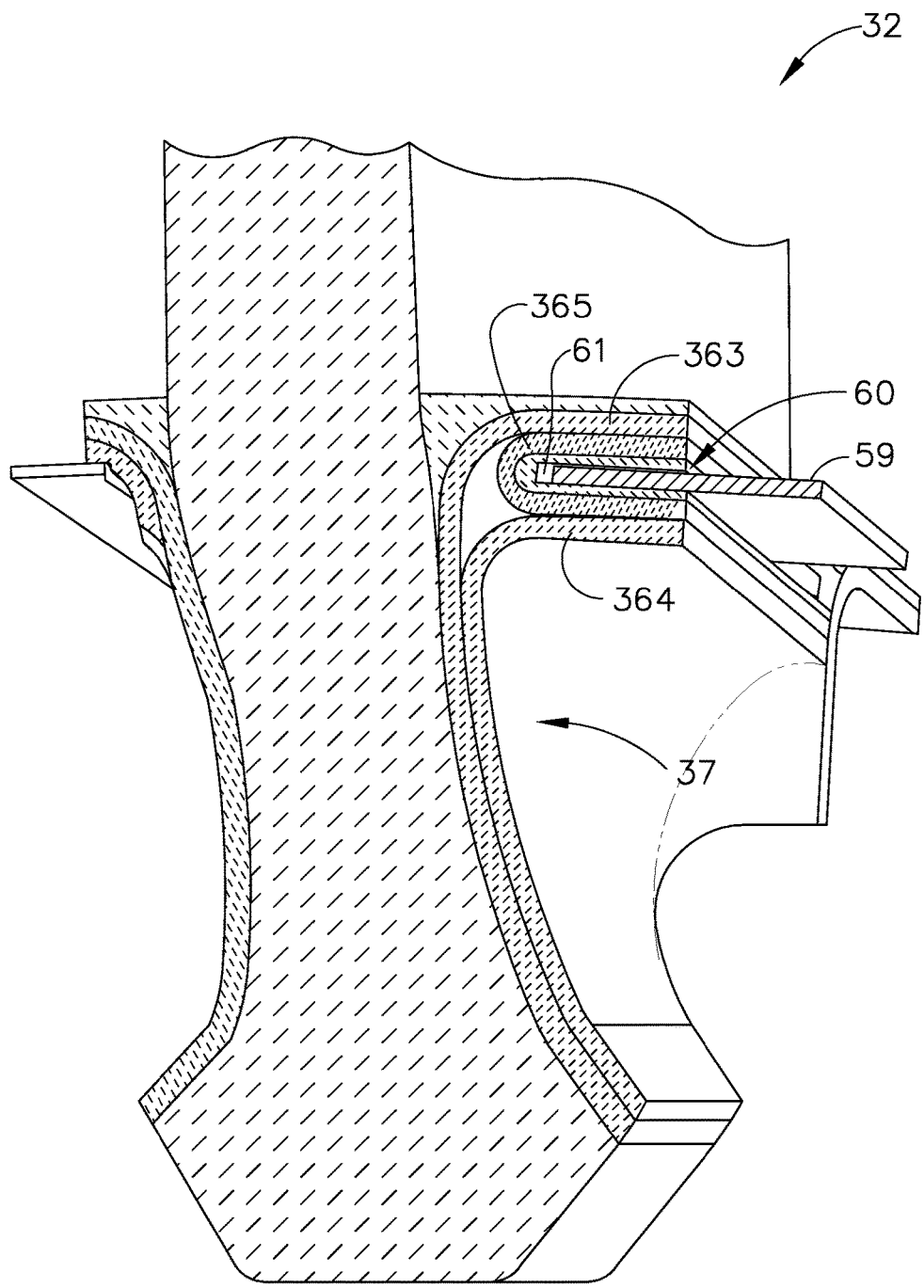

Referring now to FIG. 10, a section view of an additional rotor blade assembly 32 is depicted. This embodiment is similar to the embodiments of FIGS. 3-7 which view the split-apart plies 363, 364. Additionally, within the space created between split-apart plies 363, 364, a wrap-around ply 365 is inserted in the area defining the pocket 60. The insert 61 may or may not be utilized. The wrap-around ply 365 sandwiches the damper 59 and is placed within the pocket 60. The wrap-around ply is C-shaped or U-shaped and extends axially along the shank 37 of the rotor blade assembly 32.

The above-described rotor blade provides integral platform and damper features on a CMC blade component. The CMC plies are arranged to improve structural strength of the component. The CMC plies form the platform and damper retaining features allowing positioning of a sheet metal damper therein. The pockets may be formed by an upper platform structure and retaining tabs or a continuous lower structure. The CMC plies may be tied into the blade assembly shank, angel wings or adjacent or both. Additionally, the seal overlaps may sandwich the plies or may the plies may be positioned against the overlap areas. Continuous fibers are utilized to maximize structural capability of the ceramic matrix composite (CMC) components. With this in mind, the embodiments are provided so that the prepreg plies are long, continuous, and rooted in supporting features like the dovetail to provide an optimal structure.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A rotor blade assembly for a gas turbine engine, comprising: a blade portion formed of laid-up ceramic matrix composite (CMC) material having a leading edge and a trailing edge, a pressure side extending between said leading edge and said trailing edge, a suction side opposite said pressure side, said suction side extending between said leading edge and said trailing edge; a root formed of said laid-up CMC material having a dovetail at a radially inward end; a shank formed of said laid-up CMC material and integral with said root, said shank extending from said root and a platform extending circumferentially from said shank; a plurality of continuous fiber damper retaining plies of said laid-up CMC material, said plurality of continuous fiber damper retaining plies extending from said dovetail to said platform, said plurality of continuous fiber damper retaining plies being split apart to define an upper at least one ply and a lower at least one ply near the leading edge and the trailing edge; said upper at least one ply extending from said leading edge to said trailing edge and from said dovetail to said platform; said lower at least one ply disposed at said leading edge and said trailing edge opposite said upper at least one ply and extending continuously radially outward from said dovetail, said lower at least one ply forming a damper retaining tab extending from said dovetail and defining a damper pocket near the leading edge and the trailing edge; and, a sheet metal damper disposed in said damper pocket.

2. The rotor blade assembly of claim 1, said lower at least one ply extending continuously from said leading edge to said trailing edge.

3. The rotor blade assembly of claim 1, said lower at least one ply being discontinuous between said leading edge and said trailing edge.

4. The rotor blade assembly of claim 1, wherein said damper pocket receives a machining stock.

5. The rotor blade assembly of claim 4, said machining stock being formed of at least one of resin, matrix, chopped fiber, compound stacks of reinforced fiber plies, and laminate reinforced fiber or fiber stacks.

6. A rotor blade assembly for a gas turbine engine, comprising: a blade portion formed of laid-up ceramic matrix composite (CMC) material having a leading edge and a trailing edge, a pressure side extending between said leading edge and said trailing edge, a suction side opposite said pressure side, said suction side extending between said leading edge and said trailing edge; a root formed of said laid-up CMC material having a dovetail at a radially inward end; a shank formed of said laid-up CMC material and integral with said root, said shank extending from said root and a platform extending circumferentially from said shank; the platform defined by a plurality of continuous fiber CMC flow path plies extending from forward of said leading edge to aft of said trailing edge; a plurality of continuous fiber damper retaining plies of said laid-up CMC material, said plurality of continuous fiber damper retaining plies extending from said dovetail to said platform, said plurality of continuous fiber damper retaining plies being split apart to define an upper at least one ply and a lower at least one ply near the leading edge and the trailing edge; said upper at least one ply extending from said leading edge to said trailing edge and from said dovetail to said platform; said lower at least one ply disposed at said leading edge and said trailing edge opposite said upper at least one ply and extending continuously radially outward from said dovetail, said lower at least one ply forming a damper retaining tab extending from said dovetail and defining a damper pocket near the leading edge and the trailing edge; angel wings formed of continuous fiber CMC angel wing plies, said continuous fiber CMC angel wing plies disposed beneath said plurality of continuous fiber damper retaining plies at the leading edge and the trailing edge, said angel wings extending in a circumferential direction and in an axial direction; and, a sheet metal damper disposed in said damper pocket.

7. The rotor blade assembly of claim 6, said at least one support ply extending at an angle to an engine axis.

8. The rotor blade assembly of claim 6, wherein said at least one support ply further comprises ends which are curvilinear.

9. The rotor blade assembly of claim 6, said at least one support ply disposed between said plurality of continuous fiber CMC flow path plies and said continuous fiber CMC angel wing plies at each of leading edge and said trailing edge.

10. A rotor blade assembly for a gas turbine engine, comprising: a blade portion formed of laid-up ceramic matrix composite (CMC) material having a leading edge and a trailing edge, a pressure side extending between said leading edge and said trailing edge, a suction side opposite said pressure side, said suction side extending between said leading edge and said trailing edge; a root formed of said laid-up ceramic matrix composite (CMC) material having a dovetail at a radially inward end; a shank formed of said laid-up CMC material and integral with said root, said shank extending from said root and a platform extending circumferentially from said shank; a plurality of continuous fiber damper retaining plies of said laid-up CMC material, said plurality of continuous fiber damper retaining plies extending from said dovetail to said platform, said plurality of continuous fiber damper retaining plies extending upwardly from said dovetail and turning outward in a circumferential direction; angel wings formed of laid-up continuous fiber CMC angel wing plies, said laid-up continuous fiber CMC angel wing plies disposed beneath said plurality of continuous fiber damper retaining plies and into said continuous fiber damper retaining plies at the leading edge and the trailing edge, said angel wings extending in the circumferential direction and in an axial direction; retaining tabs formed of a plurality of laid-up CMC retaining tab plies formed near said leading edge and said trailing edge of said pressure side and said suction side, said retaining tabs being positioned between said angel wings along said pressure side and along said suction side, and extending radially outward and having at least one ply extending therebetween; an upper end of said continuous fiber damper retaining plies and said retaining tabs forming a damper pocket near said leading edge and said trailing edge; and, a sheet metal damper disposed in said damper pocket.

11. The rotor blade assembly of claim 10, said retaining tabs further comprising said plurality of laid-up CMC retaining tab plies extending in a direction from said leading edge axially toward said trailing edge, and from said trailing edge axially toward said leading edge from between said laid-up continuous fiber CMC angel wing plies and at least one flow path ply.

12. The rotor blade assembly according to claim 1, wherein said lower at least one ply extends between said leading edge and said trailing edge.

13. A rotor blade assembly, for a gas turbine engine, comprising: a blade portion formed of laid-up ceramic matrix composite (CMC) material having a leading edge and a trailing edge, a pressure side extending between said leading edge and said trailing edge, a suction side opposite said pressure side, said suction side extending between said leading edge and said trailing edge; a root formed of said laid-up CMC material having a dovetail at a radially inward end; a shank formed of said laid-up CMC material and integral with said root, said shank extending from said root and a platform extending circumferentially from said shank; a plurality of continuous fiber damper retaining plies of said laid-up CMC material, said plurality of continuous fiber damper retaining plies extending from said dovetail to said platform, said plurality of continuous fiber damper retaining plies being split apart to define an upper at least one ply and a lower at least one ply near the leading edge and the trailing edge; said upper at least one ply extending from said leading edge to said trailing edge and from said dovetail to said platform; said lower at least one ply disposed at said leading edge and said trailing edge opposite said upper at least one ply and extending continuously radially outward from said dovetail, said lower at least one ply forming a damper retaining tab extending from said dovetail and defining a damper pocket near the leading edge and the trailing edge; a c-shaped at least one ply located within said damper pocket between said upper at least one ply and said lower at least one ply; and a sheet metal damper disposed in said damper pocket.

14. The rotor blade assembly according to claim 13, wherein the sheet metal damper is disposed between ends of said c-shaped at least one ply.

15. The rotor blade assembly according to claim 1, wherein said plurality of continuous fiber damper retaining plies form a single element at a proximal end at said dovetail and split apart at a distal end to define said upper at least one ply, said lower at least one ply, and a separation therebetween.

16. The rotor blade assembly according to claim 6, wherein said plurality of continuous fiber damper retaining plies form a single element at a proximal end at said dovetail and split apart at a distal end to define said upper at least one ply, said lower at least one ply, and a separation therebetween.

17. The rotor blade assembly according to claim 6, further comprising:
a c-shaped at least one ply located within said damper pocket between said upper at least one ply and said lower at least one ply.

18. The rotor blade assembly of claim 17, said at least one support ply disposed between said flow path plies and said angel wing plies at each of leading edge and said trailing edge.

19. The rotor blade assembly according to claim 10, further comprising:
a c-shaped at least one ply located within said damper pocket between said upper at least one ply and said lower at least one ply.

20. The rotor blade assembly of claim 19, said retaining tabs further comprising said plurality of laid-up CMC retaining tab plies extending in a direction from said leading edge axially toward said trailing edge, and from said trailing edge axially toward said leading edge from between said laid-up continuous fiber CMC angel wing plies and at least one flow path ply.

* * * * *